United States Patent
Yanuzzi et al.

(10) Patent No.: US 6,855,778 B2
(45) Date of Patent: Feb. 15, 2005

(54) BLENDED THERMOFORMABLE RF SEALABLE PLASTIC

(75) Inventors: Keith Yanuzzi, Hazelton, PA (US); Donald R. Hacker, Ripon, WI (US); Michael Bower, Hazelton, PA (US)

(73) Assignee: Kama of Illinois Corporation, Hazleton, PA (US)

( * ) Notice: Subject to any disclaimer, the term of this patent is extended or adjusted under 35 U.S.C. 154(b) by 0 days.

(21) Appl. No.: 10/230,607

(22) Filed: Aug. 29, 2002

(65) Prior Publication Data

US 2003/0106287 A1 Jun. 12, 2003

Related U.S. Application Data

(60) Provisional application No. 60/339,034, filed on Dec. 10, 2001.

(51) Int. Cl.$^7$ ................................................ C08F 20/00
(52) U.S. Cl. ..................................................... 525/444
(58) Field of Search ........................... 53/523, 524, 525; 525/444

(56) References Cited

U.S. PATENT DOCUMENTS

| | | | |
|---|---|---|---|
| 4,246,381 A | * | 1/1981 | Robeson ..................... 525/444 |
| 4,405,400 A | | 9/1983 | Petersen-Hoj |
| 4,512,838 A | | 4/1985 | Rausing |
| 4,698,246 A | | 10/1987 | Gibbons et al. |
| 4,818,588 A | | 4/1989 | Okabe et al. |
| 5,021,298 A | | 6/1991 | Revell |
| 5,244,091 A | * | 9/1993 | Tannenbaum ............... 206/462 |
| 5,756,578 A | * | 5/1998 | Hanes ....................... 525/92 F |
| 5,859,116 A | * | 1/1999 | Shih ........................... 524/493 |
| 5,945,174 A | | 8/1999 | Shaw et al. |
| 6,261,655 B1 | | 7/2001 | Rosenbaum et al. |
| 6,401,926 B1 | * | 6/2002 | Lo ............................. 206/531 |
| 6,451,912 B1 | | 9/2002 | Kelch |
| 6,599,994 B2 | * | 7/2003 | Shelby et al. ............... 525/444 |
| 2002/0055586 A1 | * | 5/2002 | Dalgewicz, III et al. |
| 2002/0162771 A1 | * | 11/2002 | Van Wagenen et al. |
| 2003/0021945 A1 | * | 1/2003 | Kelch |

* cited by examiner

*Primary Examiner*—Scott A. Smith
*Assistant Examiner*—Brian Nash
(74) *Attorney, Agent, or Firm*—Tracey D. Beiriger

(57) ABSTRACT

A thermoformable, RF-sealable material for use in packaging. The material is produced from a blend including between approximately 5% and 50% by weight of PETG, and between approximately 50% and 95% by weight of PET. A small amount of color concentrate may be added to the blend. The blend may be extruded into sheets and thermoformed to produce packaging material.

5 Claims, No Drawings

BLENDED THERMOFORMABLE RF SEALABLE PLASTIC

REFERENCE TO RELATED APPLICATIONS

This application claims priority of U.S. Provisional Patent Application No. 60/339,034, filed Dec. 10, 2001, under 35 U.S.C. §119.

BACKGROUND OF THE INVENTION

The present invention relates generally to the field of packaging, and more specifically to a plastic material suitable for manufacturing radio frequency sealable ("RF-sealable") packaging material.

In the packaging industry, traditionally, a "clamshell blister package" refers to a plastic package formed from a pair of layers of thermoformable plastic. An article to be packaged is retained between the layers. Typically, the layers, which may be unitary, are hinged along a common edge and are sealed. Well-known sealing techniques include, for example, heat application, use of chemical adhesives, and radio frequency sealing ("RF-sealing"). An example of a clamshell blister package is disclosed in U.S. Pat. No. 5,788,105, the entirety of which is incorporated herein by reference. Other packages may require sealing besides those having clamshell parts, such as two-piece packages.

In many packaging applications, RF-sealing is the preferred technique to seal the package. The layers for RF-sealable packages are usually composed of polyvinyl chloride (PVC), at least in part because this material is easily RF-sealed. However, the industry in recent times has attempted to move away from the use of PVC packaging material, as it is perceived as less environmentally friendly than other possible materials. For example, the European market has searched for a number of years for an alternative material to PVC, due to Europe's propensity to incinerate waste. One such alternative material is polyethylene terephthalate (PET), a common type of polyester.

However, to seal a blister manufactured from PET plastic, a method other than RF-sealing must generally be used because PET is much less polar than materials that are readily RF-sealed. As such, it has been difficult to provide a thermoformable PET plastic material for packaging due to the inability to effectively RF-seal the material.

Accordingly, there is a need in the art to provide an improved RF-sealable, packaging material that is composed of compounds perceived as more environmentally friendly than PVC.

There is a further need in the art to provide an improved thermoformable packaging material.

There is an additional need in the art to provide a process for manufacturing an RF-sealable material for packaging that provides perceived environmental benefits similar to that of PET, and provides RF-sealing capabilities comparable to PVC.

SUMMARY OF THE INVENTION

These needs and others are met or exceeded by the present RF-sealable packaging material, which provides environmental and other benefits of PET, with sealing benefits comparable to PVC. The present invention further provides a method for forming a blended, thermoformed, RF-sealable package material.

More specifically, one aspect of the present invention provides an RF-sealable, thermoformable plastic material for use in packaging, the material including polyethylene terephthalate (PET) and glycolised polyester (PETG). A color concentrate is optionally provided.

A preferred embodiment of the present invention includes an RF-sealable, thermoformable plastic material including PETG in a weight concentration of between approximately 5% and 50%, and PET in a weight concentration of approximately 50%–95%, plus a small amount of color concentrate.

A further preferred embodiment of the present invention includes an RF-sealable plastic packaging material comprising approximately 91% PET by weight and approximately 7% PETG by weight.

An additionally preferred embodiment of the present invention includes an RF-sealable plastic packaging material comprising approximately 91% PET by weight, approximately 7% PETG by weight, and approximately 2% color concentrate by weight.

In a method according to the present invention for forming an RF-sealable, thermoformable package, amounts of polyethylene terephthalate (PET) and glycolised polyester (PETG) are combined, optionally along with a small amount of color concentrate, to form a blend. The blend is extruded to form at least one thermoformable sheet, and the at least one sheet is thermoformed to form at least first and second sections or portions of a package. At least part of the first and second sections or portions is RF-sealed to seal the package. An article optionally may be placed within the package for retention before RF-sealing the first and second sections or portions.

In a preferred method, the blended material includes approximately 91% PET by weight and approximately 7% of PETG by weight. The present method may be further enhanced by adding approximately 2% by weight color concentrate to the blend.

DETAILED DESCRIPTION OF THE INVENTION

The present invention provides a blended, thermoformable RF-sealable packaging material, allowing the sealing benefits of certain materials, such as PVC, without the environmental drawbacks typically associated with PVC. The present invention further provides a method for forming a packaging material having a blended thermoformed RF-sealable plastic.

More specifically, the present invention features a PETG-PET blended material for packaging, which provides the benefits of RF-sealing to a polyester packaging material. The present invention also provides a thermoformable blend material capable of extrusion for use in forming thermoformable packaging material.

Preferably, the blended thermoformable plastic material is a blended material having a weight ratio of approximately 93% PET to approximately 7% PETG. Optionally, a small amount of color concentrate may be added to the blend to tint the plastic material. This tint may, optionally, be used to give the material the appearance of PVC, which may be desirable for aesthetic purposes. The color concentrate is generally a dry color pigment compounded into a base plastic resin for the purpose of coloring plastic during processing.

In general, the amount of PETG used in the blend for the present plastic material is at least the amount deemed to be sufficient to allow the combined material to achieve polarity for RF-sealing. Most preferably, the ratio for the present packaging material is approximately 91% by weight of PET to 7% by weight of PETG to 2% by weight of color concentrate. As used herein, "approximately" is intended to mean±(plus or minus) 3.5% (weight percentage) for each of the components of the blend. The present inventors have discovered that inclusion of approximately 7% PETG by weight in the blend provides the benefits of extrudability of the blend, while minimizing costs and allowing an effective RF-seal for the thermoformed package material. An insufficient amount of PETG tends to lead to inadequate RF-sealing (seal strength). However, an excess of PETG becomes cost-prohibitive and/or leads to reprocessing issues of process scrap/trim. Therefore, preferably an approximate 7% PETG amount by weight is used. It should be appreciated, however, that other amounts of PETG within a range of, for example, approximately 5–50% by weight may be used to achieve similar RF-sealing benefits. Above about 10% PETG by weight, though, advantages from the ability to reprocess the present blended material decrease.

In a process of forming a packaging material having the blended thermoformable plastic according to the present invention, a blend of PET, PETG, and (optionally) color concentrate is combined according to the above-listed weight percentage ranges, and one or more sheets are extruded from the blend using a typical polyester extrusion process. The sheet or sheets are then thermoformed to create the packaging material. The packaging material may be formed into a desired shape, such as a clamshell. With minor adjustment if any, thermoformable plastic sheets comprised of the inventive blended thermoformable sealable plastic can be RF-sealed together in an RF-sealing process that may be typically used for, for example, PVC material. The nature of the inventive blend may result in the increase of RF power and/or sealing pressure to create comparable seals, relative to PVC.

In a preferred aspect of this method, the packaging material formed form the thermoformed sheets includes at least first and second sections or portions of a package. The at least first and second sections or portions may be formed so as to be hinged together, if desired. The package is RF-sealed, along one or more adjacent edges of the first and second sections or portions, for example, or elsewhere to retain an article disposed within the package. Various methods of sealing the first and second sections or portions are possible such as, but not limited to, ultrasonic sealing, RF-sealing, and heat sealing (e.g., radiant heat sealing), though RF-sealing is preferred. The article may be disposed within one or more containers, such as blisters, formed during formation of the first and second sections or portions of the package. Alternatively, the blisters may be separately formed pieces. It will be understood that the package produced by the inventive method of the present invention may include more than two sections or portions. Alternatively, the package may be formed from a single, integral piece having two portions surrounding the article and sealed to itself. A package produced using the method of the present invention may contain a combination of the blended, thermoformable RF-sealable packaging material along with other materials, as will be understood by those in the art.

Thus, the present blended, thermoformable RF-sealable plastic and method of the present invention provides sealing advantages normally associated with materials such as PVC, while retaining environmental benefits usually associated with materials such as PET. The packaging material according to preferred embodiments and methods of the present invention is capable of being extruded and thermoformed by known methods, and can be RF-sealed using methods known for PVC RF-sealing, with minor adjustments.

While a particular embodiment of the present blended, thermoformable RF-sealable plastic has been shown and described, it will be appreciated by those skilled in the art that changes and modifications may be made thereto without departing from the invention in its broader aspects and as set forth in the following claims.

What is claimed is:

1. A blended thermaformable packaging material comprising a blended material comprising: between 5 and 10% by weight of glycolised polyester (PETG) and between 50–95% by weight of polyethylene terephthalate (PET), wherein the amount of PETG used is sufficient to allow the combined blended material to achieve polarity for radio frequency sealing, and the blended material is radio frequency sealable.

2. The packaging material of claim 1, wherein the blended material is selected from the group consisting essentially of PETG and PET and further comprises a color concentrate, and contains no polyvinyl chloride (PVC).

3. The packaging material of claim 1, wherein said blended material comprises approximately 91% by weight of PET and approximately 7% by weight of PETG.

4. The packaging material of claim 3, wherein said blended material further comprises approximately 2% by weight of color concentrate.

5. A package formed from the packaging material of claim 1.

* * * * *

UNITED STATES PATENT AND TRADEMARK OFFICE
CERTIFICATE OF CORRECTION

PATENT NO. : 6,855,778 B2  Page 1 of 1
APPLICATION NO. : 10/230607
DATED : February 15, 2005
INVENTOR(S) : Yanuzzi et al.

It is certified that error appears in the above-identified patent and that said Letters Patent is hereby corrected as shown below:

Column 4, line 27, line 1 of Claim 1, delete "thermaformable" and insert --thermoformable--.

Signed and Sealed this

Thirty-first Day of July, 2007

JON W. DUDAS
*Director of the United States Patent and Trademark Office*